United States Patent

Shi

[11] Patent Number: 5,867,615
[45] Date of Patent: Feb. 2, 1999

[54] COMPACT STRAIGHT CHANNEL FIBER OPTIC INTENSITY MODULAR

[75] Inventor: Yongqiang Shi, Carlsbad, Calif.

[73] Assignee: The United States of America as represented by the Secretary of the Air Force, Washington, D.C.

[21] Appl. No.: 898,635

[22] Filed: Jul. 22, 1997

[51] Int. Cl.⁶ .................................................. G02F 1/035
[52] U.S. Cl. ........................................ 385/3; 385/1; 385/2
[58] Field of Search .................................. 385/3, 1, 2, 4, 385/8, 14, 16

[56] References Cited

U.S. PATENT DOCUMENTS 4,791,388  12/1988  Sanford et al. ........................... 385/16
5,638,468   6/1997  Tokano et al .............................. 385/3

*Primary Examiner*—Phan T. H. Palmer
*Attorney, Agent, or Firm*—Robert L. Nathans

[57] ABSTRACT

Two modes in the waveguide are excited by establishing the input light polarization at forty-five degrees so that the modes can be excited equally. After propagating through the waveguide, the two modes are forced into one polarization by a polarizing fiber so that they can interfere, and the resulting novel straight channel modulator is compact and does not require strict single mode operation since the interference is in the polarizing fiber, which is a very good mode filter.

12 Claims, 1 Drawing Sheet

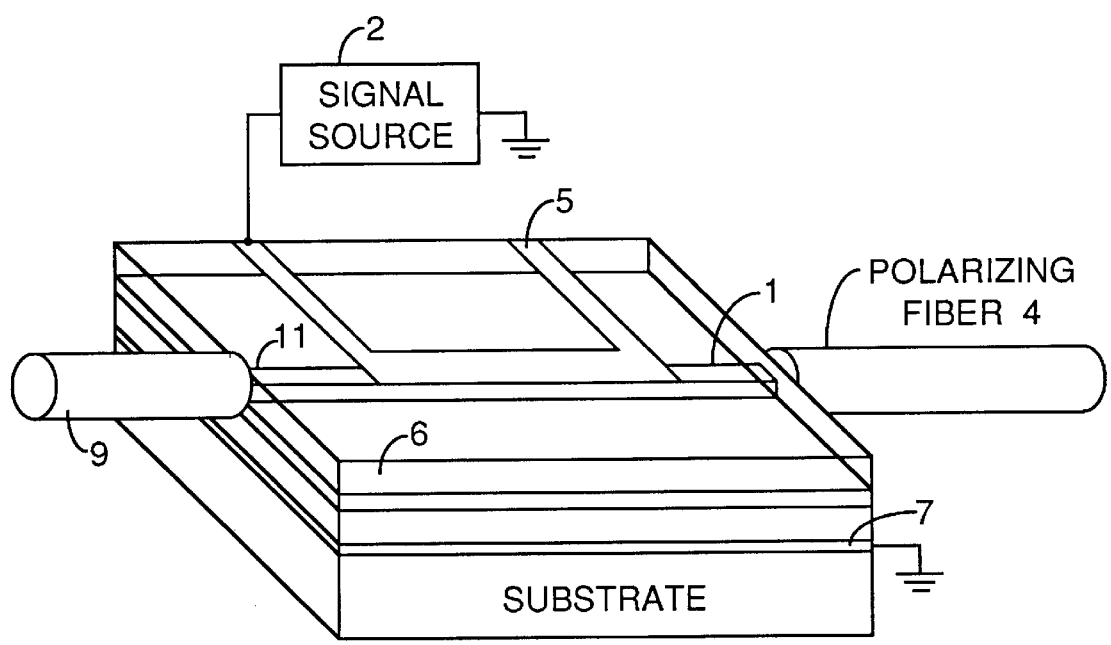

COMPACT STRAIGHT CHANNEL FIBER OPTIC INTENSITY MODULAR

STATEMENT OF GOVERNMENT INTEREST

The invention described herein may be manufactured by or for the Government for governmental purposes without the payment of any royalty thereon.

BACKGROUND OF THE INVENTION

The present invention relates to the field of light beam modulators.

Various types of electro-optic light beam modulators are known in the art. For example, a light beam to be modulated can be passed through a waveguide consisting of a semiconductor material or a polymer, and the intensity of the light beam can be altered by the application of an electric field to the waveguide by an electrical signal source and an electrode affixed to the waveguide. See for example U.S. Pat. No. 4,877,299 to Richard A. Soref.

In the past, straight channel light intensity modulators required an external waveplate and a bulky polarizer for the intensity modulation of light passing through the modulators. It would be desirable to eliminate both of these components by using a polarizing fiber in an electro-optic straight channel modulator configuration.

BRIEF SUMMARY OF THE INVENTION

In accordance with a preferred embodiment of the invention, a compact, straight line light intensity modulator is provided with a light transmissive waveguide supporting a TM polarization mode and a TE polarization mode, an input polarization maintaining (PM) fiber for introducing light therein having a polarization of forty-five degrees so that the modes within the waveguide can be excited equally. A modulating signal source is employed for changing the relative phase relationship between the TM and TE modes of the waveguided light, and a polarizing fiber connected to the output portion of the waveguide forces the two modes into one polarization, to enable detection of changes in this relative phase relationship indicative of a modulated output signal.

BRIEF DESCRIPTION OF THE DRAWING

Other features and advantages of the invention will become apparent upon study of the sole figure illustrating a preferred embodiment of the invention, taken in conjunction with the following description.

DETAILED DESCRIPTION OF THE INVENTION

A straight channel intensity modulator requires the interference between two polarization eigenmodes, namely the TE and TM modes. Therefor, one needs to first excite two modes in the waveguide by establishing the input light polarization at forty-five degrees so that the waveguide modes can be excited equally. After propagating through the waveguide, the two modes are forced into one polarization by a polarizer so that they can interfere. In accordance with the invention, a polarizing fiber is employed for this purpose to eliminate the above mentioned external waveplate and bulky polarizer of the prior art. Also, the resulting novel straight channel modulator does not require strict single mode operation, since the resulting interference is in the polarizing fiber which is a very good mode filter.

More specifically, as illustrated in the sole figure, the straight channel light intensity modulator of the present invention includes a light transmissive waveguide 1, positioned over substrate 6. PM input optical fiber 9 introduces the polarized light into the waveguide 1 via input portion 11, the light having an input polarization of forty-five degrees for exciting the TM and TE modes equally. Modulation control means are provided for changing the relative phase relationship between the TM and TE mode components within light transmissive waveguide 1 in accordance with an electrical modulation control signal applied to the light transmissive waveguide by signal source 2 via electrodes 5 and 7. Waveguide 1 can be made of a type of polymer whereby an electric field applied thereto changes its index of refraction in one or both birefringent directions. This in turn alters the phase relationship between the TE and TM components of the polarized light transmitted through the waveguide. Polarizing fiber 4 is connected to the output portion of the light transmissive waveguide 1 for forcing the TE and TM modes into one polarization which enables detection of changes in their relative phase relationship by a photodetection device such as a photodiode, not shown.

Thus, if no voltage signal is applied to the electrodes by voltage signal source 2, the light can be transmitted through the waveguide unaffected and conversely, a voltage signal can be applied by signal source 2 to the electrodes to change the phase relationship between the TE and TM modes to attenuate the light output, thereby to modulate the light beam. Hence the voltage source 2 and electrodes 5 and 7 function as a light beam modulation control means. The PM input fiber 9 can be used as a polarizer and the output polarizing fiber 4 acts like an analyzer. In contrast, in standard optical fibers the state of polarized light varies due to random birefringence therein. The control signal applied to the electrodes can be a binary DC pulse train or an RF signal having a frequency far below the frequency of light. Waveguide 1 can be composed of a polymer such as side-chain electro-optic polymers or other material such as lithium niobate and gallium arsenide, well known to workers skilled in the art.

While a preferred embodiment has been described, variations of the foregoing will occur to those skilled in the art and thus the scope of the invention is to be limited solely by the terms of the following claims and art recognized equivalents thereto.

What is claimed is:

1. A light intensity modulator comprising:
   (a) a light transmissive waveguide having an input portion and an output portion for supporting a TM polarization mode and a TE polarization mode within the waveguide;
   (b) input means for introducing light into the input portion of said light transmitting waveguide, said light having an input polarization for exciting the TM and TE modes equally;
   (c) modulation control means for changing the relative phase relationship between TM and TE mode components within said light transmissive waveguide in accordance with an electrical modulation control signal applied to said light transmissive waveguide; and
   (d) a fiber connected to the output portion of said light transmissive waveguide for forcing said modes into one polarization to enable detection of changes in said relative phase relationship indicative of a modulated output signal.

2. The modulator of claim 1 wherein said input means comprises a polarization maintaining fiber attached to the input portion of said light transmissive waveguide.

3. The modulator of claim 2 wherein said modulation control means comprises an electrical signal source coupled to an electrode for changing an electrical field within said light transmissive waveguide.

4. The modulator of claim 1 wherein said modulation control means comprises an electrical signal source coupled to an electrode for changing an electrical field within said light transmissive waveguide.

5. A light intensity modulator comprising:

(a) a light transmissive waveguide having an input portion and an output portion for supporting a TM polarization mode and a TE polarization mode within the waveguide;

(b) input means for introducing light into the input portion of said light transmitting waveguide, said light having an input polarization of forty-five degrees for exciting the TM and TE modes equally;

(c) modulation control means for changing the relative phase relationship between TM and TE mode components within said light transmissive waveguide in accordance with an electrical modulation control signal applied to said light transmissive waveguide; and (d) a polarizing fiber abutting the output portion of said light transmissive waveguide for forcing said modes into one polarization to enable detection of changes in said relative phase relationship indicative of a modulated output signal.

6. The modulator of claim 5 wherein said input means comprises a polarization maintaining fiber abutting the input portion of said light transmissive waveguide.

7. The modulator of claim 6 wherein said modulation control means comprises an electrical signal source coupled to an electrode for changing an electrical field within said light transmissive waveguide.

8. The modulator of claim 5 wherein said modulation control means comprises an electrical signal source coupled to an electrode for changing an electrical field within said light transmissive waveguide.

9. A straight channel birefringent light intensity modulator comprising:

(a) a straight channel dual TE/TM mode electro-optic light transmission means having an input portion that has defined polarization states for exciting TE and TM modes equally and an output portion functioning as a polarizer to force said TE and TM modes into a single polarization; and (b) modulator means for altering the relative phase relationship between the TE and TM modes therein, thereby to produce intensity modulation by interference within said output portion.

10. The modulator of claim 9 wherein said modulator means includes electrode means for applying an electrical field to said light transmission means.

11. The modulator of claim 10 wherein said output portion comprises a polarizing fiber.

12. The modulator of claim 9 wherein said output portion comprises a polarizing fiber.

* * * * *